US008560825B2

(12) United States Patent
Butler et al.

(10) Patent No.: US 8,560,825 B2
(45) Date of Patent: Oct. 15, 2013

(54) STREAMING VIRTUAL MACHINE BOOT SERVICES OVER A NETWORK

(75) Inventors: Eric K. Butler, San Jose, CA (US); Mihail Corneliu Constantinescu, San Jose, CA (US); Reshu Jain, Sunnyvale, CA (US); Prasenjit Sarkar, San Jose, CA (US); Aameek Singh, University Place, WA (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 12/827,169

(22) Filed: Jun. 30, 2010

(65) Prior Publication Data

US 2012/0005467 A1    Jan. 5, 2012

(51) Int. Cl.
*G06F 9/00*    (2006.01)
(52) U.S. Cl.
USPC .......................................................... 713/2
(58) Field of Classification Search
USPC ........................................................ 713/1, 2
See application file for complete search history.

(56) References Cited

U.S. PATENT DOCUMENTS

| | | | |
|---|---|---|---|
| 2005/0080823 A1* | 4/2005 | Collins | 707/200 |
| 2005/0228950 A1* | 10/2005 | Karr | 711/114 |
| 2007/0294563 A1* | 12/2007 | Bose | 714/5 |
| 2008/0082809 A1 | 4/2008 | Rothman et al. | |
| 2008/0104588 A1* | 5/2008 | Barber et al. | 718/1 |
| 2008/0263349 A1 | 10/2008 | Ota et al. | |
| 2009/0204824 A1* | 8/2009 | Lin et al. | 713/193 |
| 2009/0222496 A1* | 9/2009 | Liu et al. | 707/204 |
| 2011/0126007 A1* | 5/2011 | Eastman et al. | 713/165 |
| 2011/0238969 A1* | 9/2011 | Warkentin et al. | 713/2 |
| 2011/0246626 A1* | 10/2011 | Peterson et al. | 709/220 |

FOREIGN PATENT DOCUMENTS

WO    2011/069977 A2    6/2011

OTHER PUBLICATIONS

Ivan Krsul et al., "VMPlants: Providing and Managing Virtual Machine Execution Environments for Grid Computing", Proceedings of the ACM/IEEE SC2004 Conference, Pittsburgh, PA, USA, Nov. 6-12, 2004, IEEE, Nov. 2004, pp. 1-12.
Hai Jin et al., "ChinaV: Building Virtualized Computing System", HPCC '08, 10th IEEE International Conference on High Performance Computing and Communications, Sep. 2008, pp. 21-35.
International Application U.S. Appl. No. PCT/EP2011/060123, "PCT Notification of Transmittal of the International Search Report and the Written Opinion of the International Searching Authority, or the Declaration", dated Dec. 1, 2011.

* cited by examiner

*Primary Examiner* — Kim Huynh
*Assistant Examiner* — Alyaa Mazyad
(74) *Attorney, Agent, or Firm* — Mohammed Kashef

(57) ABSTRACT

Embodiments of the invention are directed to streaming virtual machine boot services over a network. An aspect of the invention includes booting a first virtual machine and recording data and metadata from a virtual machine boot image into a virtual machine boot file. The data and metadata are accessed in the process of booting the first virtual machine. The virtual machine boot image has setup information of the virtual machine type of the first virtual machine. The virtual machine boot file is configured for the virtual machine type of the first virtual machine. A descriptor is added to metadata of the virtual machine boot image, which references a location of the virtual machine boot file for the virtual machine type of the first virtual machine. When subsequently booting a second virtual machine of the same type of virtual machine as the first virtual machine, data are streamed from the virtual machine boot file to a virtual machine monitor of a second virtual machine without the need to stream data from the virtual machine boot image.

19 Claims, 6 Drawing Sheets

STREAMING VIRTUAL MACHINE BOOT SERVICES OVER A NETWORK

BACKGROUND

Embodiments of the invention relate to virtual machines, and in particular, to streaming virtual machine boot services over a network.

A virtual machine is a software abstraction of an underlying physical host machine. The software abstraction isolates the virtual machine from the host machine. Virtualized computing architecture allows multiple machines with heterogeneous operating systems to run in isolation, side-by-side, on the same physical hardware (e.g., server). Each virtual machine has its own set of virtual hardware allocated to it, including random access memory (RAM) and central processing unit (CPU) resources. Therefore, multiple virtual machines can operate concurrently, on the same host machine, without interfering with each other.

Virtualization decouples physical hardware of a host machine from the operating system of a virtual machine. Decoupling physical hardware for virtual machines provides resource utilization flexibility, protection, and isolation between a virtual environment and the underlying host machine. An operating system, known as a guest operating system, can run on a virtual machine and appear to an end user as if the operating system was running on a physical machine.

A virtual machine monitor, also known as a hypervisor, is a software layer that provides the abstraction of a virtual machine on a physical host machine. The software layer between guest machines' operating systems and a host machine's hardware creates virtual machines that emulate individual physical machines. Virtual machine monitors allow multiple operating systems to run concurrently on guest virtual machines on a single hardware platform.

A virtual machine is typically booted from a virtual machine image file. A virtual machine image file is an image of a virtual machine's operating system, software installation, and configuration. Virtual machines are self-contained in a virtual machine image file, which are typically stored in a virtual machine image repository that is accessible over a network. The virtual machine image file is typically copied to a host machine from an image repository over a network. In addition, a virtual machine image file can be used to boot multiple virtual machines having the same operating system, software, and configuration. However, virtual machine image files are very large, typically requiring gigabytes of storage. Accordingly, copying a virtual machine image requires a high bandwidth connection and can take a long time.

BRIEF SUMMARY

Preferred embodiments of the invention are directed to streaming virtual machine boot services over a network. An aspect of the invention includes a first method for streaming virtual machine boot services over a network. The first method includes booting a first virtual machine over a network. Data and metadata accessed in the process of booting the first virtual machine are recorded from a virtual machine boot image into a virtual machine boot file. The virtual machine boot image has setup information of a virtual machine type of the first virtual machine. The virtual machine boot file is configured for the virtual machine type of the first virtual machine. The first method further includes adding a descriptor to the metadata of the virtual machine boot image. The descriptor references a location of the virtual machine boot file for the virtual machine type of the first virtual machine. The first method further includes streaming the data from the virtual machine boot file to a virtual machine monitor of the second virtual machine for booting a second virtual machine of the same type as the first virtual machine.

Another aspect of the invention includes a second method for streaming virtual machine boot services over a network. The second method includes booting a virtual machine and recording data and metadata accessed in the process of booting the virtual machine from a virtual machine boot image into a virtual machine boot file. The second method further includes adding a descriptor to metadata of the virtual machine boot image. The descriptor references a location of the virtual machine boot file for the virtual machine type of the virtual machine. The second method further includes streaming the data from the virtual machine boot file to a virtual machine monitor of the virtual machine for subsequently booting the virtual machine.

Another aspect of the invention includes a system for streaming virtual machine boot services over a network. The system includes a virtual machine image repository that stores a virtual machine boot image and a virtual machine boot file. The virtual machine boot image and the virtual machine boot file are used to boot a virtual machine. The system further includes a virtual machine monitor that boots a virtual machine of the virtual machine monitor. The virtual machine monitor records data and metadata accessed in the process of booting the virtual machine from the virtual machine boot image into the virtual machine boot file. The virtual machine monitor further adds a descriptor to metadata of the virtual machine boot image. The descriptor references a location of the virtual machine boot file for the virtual machine type of a virtual machine that is booted. The virtual machine monitor further streams the data from the virtual machine boot file, when subsequently booting a virtual machine being of a same type of a virtual machine previously booted.

These and other, features, aspects, and advantages of the present invention will be apparent with reference to the following detailed description and appended claims.

DETAILED DESCRIPTION

Embodiments of the invention are directed to streaming virtual machine boot services over a network. Virtual machine boot times over wide area networks (WANs) are slow because of latency and throughput issues. Virtual machine image repositories are large, and therefore the virtual machine images cannot be replicated to all locations hosting virtual machines. Infrastructures hosting virtual machines need to be close to the storage of virtual machine boot images because system administrators typically use local networking technology (e.g., fiber channel) for booting virtual machines. Therefore, streaming virtual machine boot services over WANs have been impractical. According to embodiments of the invention, virtual machine boot times over WANs are improved (without using local auxiliary storage) by taking advantage of the fact that the order of data access is fixed for particular virtual machine types and virtual machine boot images.

In an exemplary embodiment, trial boots of virtual machines are done using a virtual machine boot image. The virtual machines booted in the trial boots are of a particular virtual machine type. All data accesses to the virtual machine boot image during the boot time are recorded linearly in a virtual machine boot file. A descriptor is added to the metadata describing the virtual machine boot image. The descriptor is a pointer that references a location of the virtual machine boot file for a specific virtual machine type.

A second virtual machine is subsequently booted that is of the same virtual machine type of a virtual machine booted previously. The virtual machine monitor of the second virtual machine is provided with access to the metadata of a virtual machine boot image at the time of booting. A virtual machine image server streams data from the virtual machine boot file to the virtual machine monitor hosting the second virtual machine.

The virtual machine monitor of the second virtual machine maintains an ordered block list that corresponds to the order of data blocks in the virtual machine boot file. Some of the data blocks in the virtual machine boot file are prefetched into the virtual machine monitor's memory of the second virtual machine, as only a few data blocks are required at any given point because of data streaming. Therefore, disk storage for the streamed virtual machine boot file is not needed. The virtual machine monitor of the second virtual machine first consults the block list to see if a block from the virtual machine boot file is present in its memory when the virtual machine monitor needs access to the block. A block is consumed from the virtual machine monitor's memory and removed from the block list, if the block was referenced in the block list. A block is accessed directly from the virtual machine boot image, if the block was not referenced in the block list.

Figure 1:
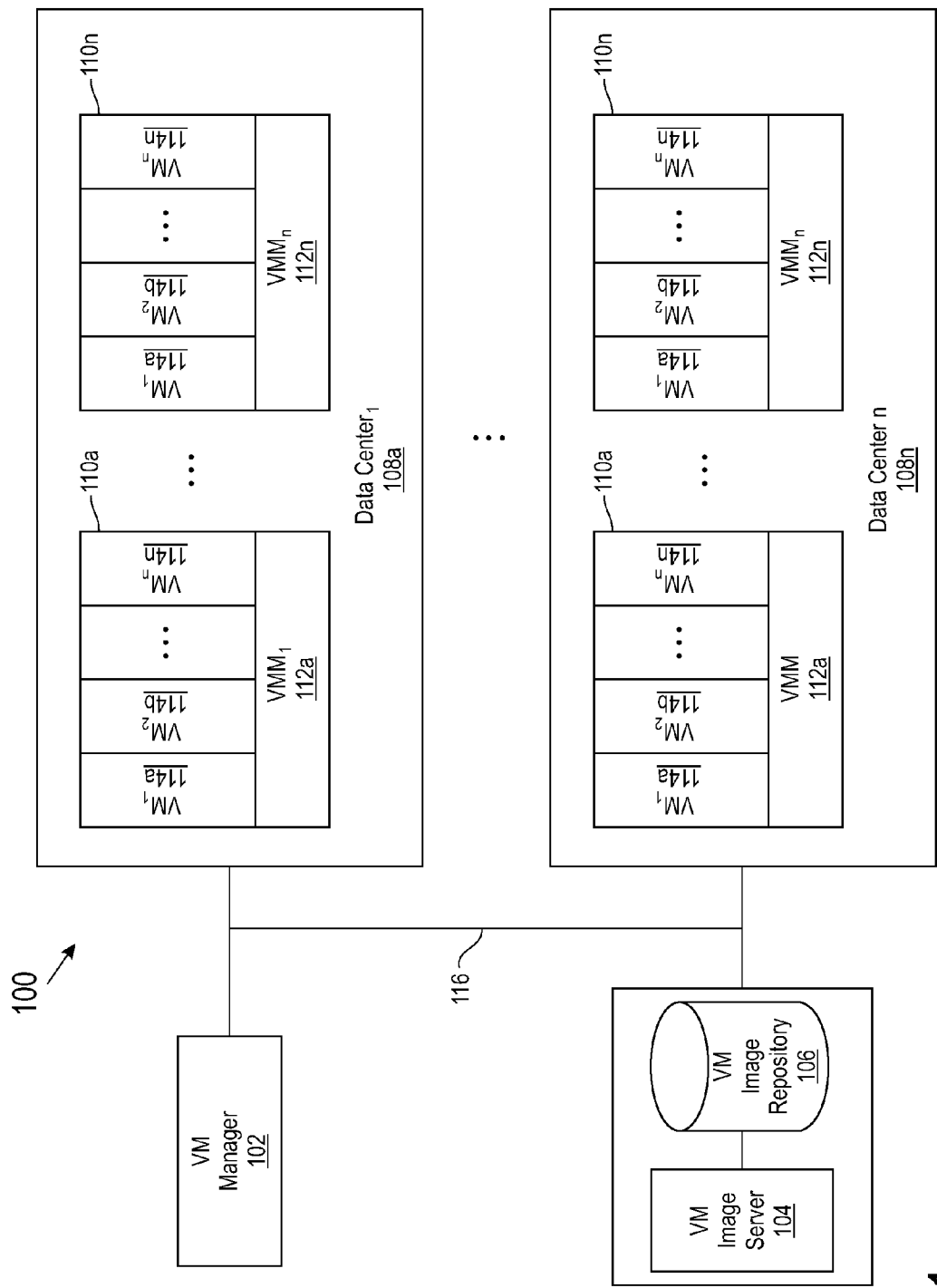
FIG. 1 is a diagram of system for streaming virtual machine boot services over a network, according to one embodiment.

FIG. 1 is a diagram of a system 100 for streaming virtual machine boot services over a network, according to one embodiment. The system 100 includes a virtual machine manager 102. In one embodiment, the virtual machine manager 102 is responsible for centralized management of a virtual machine infrastructure. A system administrator may use the virtual machine manager 102 to manage the virtual machine infrastructure remotely from where the physical machines hosting virtual machines reside. For example, managing a virtual machine infrastructure includes creating, editing, starting, stopping, and viewing performance and utilization statistics of virtual machines in a virtual machine infrastructure.

The system 100 further includes a virtual machine image server 106. For example, a virtual machine image server may be a file server for managing virtual machine image storage and streaming data from the virtual machine image file to the virtual machine monitor hosting a virtual machine to be booted. The virtual machine image server is connected to a virtual machine image repository 106. In one embodiment, virtual machine image files are stored in the virtual machine image repository 106 by the virtual machine image server 106. For example, a system administrator using the virtual machine manager 102 would connect to the virtual machine image server 104 for available virtual machine image files in the virtual machine image repository 106. In an exemplary embodiment, system administrators are able to select the desired virtual machine image file and execute the creation of a virtual machine using the virtual machine image file.

The system 100 further includes a plurality of data centers 108a . . . 108n. Each data center 108a . . . 108n comprises a plurality of servers 110a . . . 110n. In one embodiment, each server 110a . . . 110n functions as a hardware platform for virtual machines. Each server 108a . . . 108n hosts a virtual machine monitor $VMM_1$ 110a . . . $VMM_n$ 110n and a plurality of virtual machines $VM_1$ 114a, $VM_2$ 114b . . . $VM_n$ 114n. For example, the virtual machines $VM_1$ 114a, $VM_2$ 114b . . . $VM_n$ 114n function as a software layer of the underlying physical host servers 110a . . . 110n. In an exemplary embodiment, the virtual machines $VM_1$ 114a, $VM_2$ 114b . . . $VM_n$ 114n being virtualized on servers 110a . . . 110n allow the plurality of virtual machines $VM_1$ 114a, $VM_2$ 114b . . . $VM_n$ 114n to run in isolation, on the same physical server 110a . . . 110n with their own set of virtual hardware resources allocated to them.

The virtual machine manager 102, the virtual machine image server 106, the virtual machine image repository 106 and the plurality of data centers 108a . . . 108n are connected over a network 116. For example, network 116 may include, but is not limited to, a WAN and a local area network (LAN).

Figure 2:
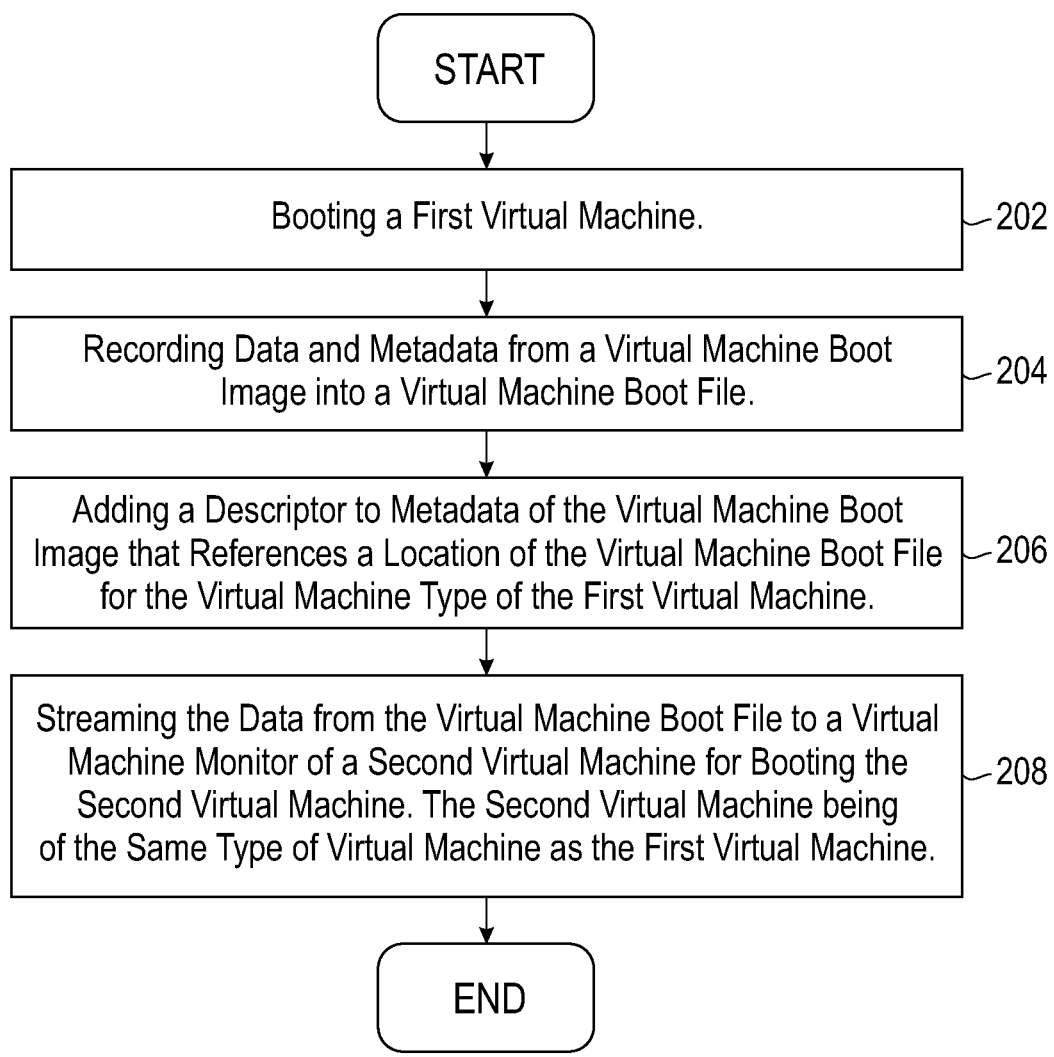
FIG. 2 is a flow chart of a first method for streaming virtual machine boot services over a network, according to one embodiment.

FIG. 2 is a flow chart of a first method 200 for streaming virtual machine boot services over a network, according to one embodiment. In step 202, virtual machine monitor 112a . . . 112n boots a first virtual machine of virtual machines $VM_1$ 114a, $VM_2$ 114b . . . $VM_n$ 114n. Booting the first virtual machine represents a first boot of a specific virtual machine type to create a virtual machine boot file for the specific virtual machine type. In an exemplary embodiment, this step is repeated for each type of virtual machine in a virtual machine infrastructure.

In step 204, the virtual machine monitor $VMM_1$ 112a . . . $VMM_n$ 112n of the virtual machine being booted $VM_1$ 114a, $VM_2$ 114b . . . $VM_n$ 114n records data and metadata accessed from the virtual machine boot image into a virtual machine boot file. The data and metadata from the virtual machine boot image are accessed during the booting of the virtual machine $VM_1$ 114a, $VM_2$ 114b . . . $VM_n$ 114n. In one embodiment, the virtual machine boot image has setup information of a virtual machine type of the virtual machine. In another embodiment, the virtual machine boot file is configured for the virtual machine type of the virtual machine. The order of data blocks accessed from the virtual machine boot image is specific to a virtual machine type and a particular virtual machine boot image. For example, most virtual machine types are standard with support for virtual block and Ethernet drivers. Therefore, the order of data blocks is specific to the virtual machine boot image and virtual machine type.

The first virtual machine $VM_1$ 114a, $VM_2$ 114b . . . $VM_n$ 114n booted is of a specific virtual machine type, and the virtual machine boot file is specific to that virtual machine type. The virtual machine boot file is specific to a virtual machine type and is a file where all data accessed from a virtual machine boot image are recorded in order of time linearly in the file. For example, the data accessed from the virtual machine boot image are recorded in the virtual machine boot file in the same order the data were accessed from the virtual machine boot image.

In another embodiment, the data and metadata from the virtual machine boot image are recorded at an intercept point that is not susceptible to caching effects. In an exemplary embodiment, this intercept point is a point when the data and the metadata are traversed from a virtual machine image repository to a virtual machine monitor $VMM_1$ 112a . . . $VMM_n$ 112n of the first virtual machine $VM_1$ 114a, $VM_2$ 114b . . . $VM_n$ 114n.

In another exemplary embodiment, this intercept point that is a point when the data and the metadata are traversed from the virtual machine monitor $VMM_1$ 112a . . . $VMM_n$ 112n to the first virtual machine $VM_1$ 114a, $VM_2$ 114b . . . $VM_n$ 114n.

In another embodiment, the virtual machine boot file is compressed to eliminate duplicate blocks. The virtual machine boot file is linearly ordered and consists of segments of data blocks from a virtual machine boot image. For example, a segment consists of a set of data blocks that are temporally adjacent, being small enough to fit in virtual machine monitor $VMM_1$ 110a . . . $VMM_n$ 110n cache, and big enough to provide adequate compression. In one embodiment, the virtual machine boot file may be compressed with a high compression level. As a result, the virtual machine boot file size is small compared to the virtual machine boot image used to boot the virtual machine $VM_1$ 114a, $VM_2$ 114b . . . $VM_n$ 114n.

In step 206, virtual machine monitor $VMM_1$ 110a . . . $VMM_n$ 110n of the first virtual machine $VM_1$ 114a, $VM_2$ 114b . . . $VM_n$ 114n adds a descriptor to the virtual machine boot image's metadata. For example, the descriptor is part of the metadata describing the virtual machine boot image. In one embodiment, the descriptor references a location of the virtual machine boot file for the virtual machine type of a first virtual machine $VM_1$ 114a, $VM_2$ 114b . . . $VM_n$ 114n. In one embodiment, the metadata are stored in the virtual machine image repository 106.

A second virtual machine $VM_1$ 114a, $VM_2$ 114b . . . $VM_n$ 114n of the same virtual machine type of the first virtual machine $VM_1$ 114a, $VM_2$ 114b . . . $VM_n$ 114n is subsequently booted. In step 208, virtual machine monitor $VMM_1$ 110a . . . $VMM_n$ 110n of the second virtual machine $VM_1$ 114a, $VM_2$ 114b . . . $VM_n$ 114n streams data from the virtual machine boot file. The data are streamed from the virtual machine boot file when subsequently booting the second virtual machine $VM_1$ 114a, $VM_2$ 114b . . . $VM_n$ 114n that is of the same virtual machine type of the first virtual machine $VM_1$ 114a, $VM_2$ 114b . . . $VM_n$ 114n that was previously booted. The virtual machine image server 104 streams compressed bits of data from the virtual machine boot file to the virtual machine monitor $VMM_1$ 110a . . . $VMM_n$ 110n of the second virtual machine $VM_1$ 114a, $VM_2$ 114b . . . $VM_n$ 114n. The virtual machine monitor $VMM_1$ 110a . . . $VMM_n$ 110n of the second virtual machine $VM_1$ 114a, $VM_2$ 114b . . . $VM_n$ 114n then decompress the streamed segments.

In one embodiment, the virtual machine monitor $VMM_1$ 110a . . . $VMM_n$ 110n of the second virtual machine $VM_1$ 116a, $VM_2$ 116b . . . $VM_n$ 116n is provided with access to the metadata of the virtual machine image during the boot process. Data are accessed from the virtual machine boot file by reading a data block offset and a data block length in the metadata defining a location of the data in the virtual machine boot image. In an exemplary embodiment, the virtual machine image server 104 decompresses the virtual machine boot file on the fly and streams the decompressed bits to the virtual machine monitor $VMM_1$ 110a . . . $VMM_n$ 110n of the second virtual machine $VM_1$ 116a, $VM_2$ 116b . . . $VM_n$ 116n.

Figure 3:
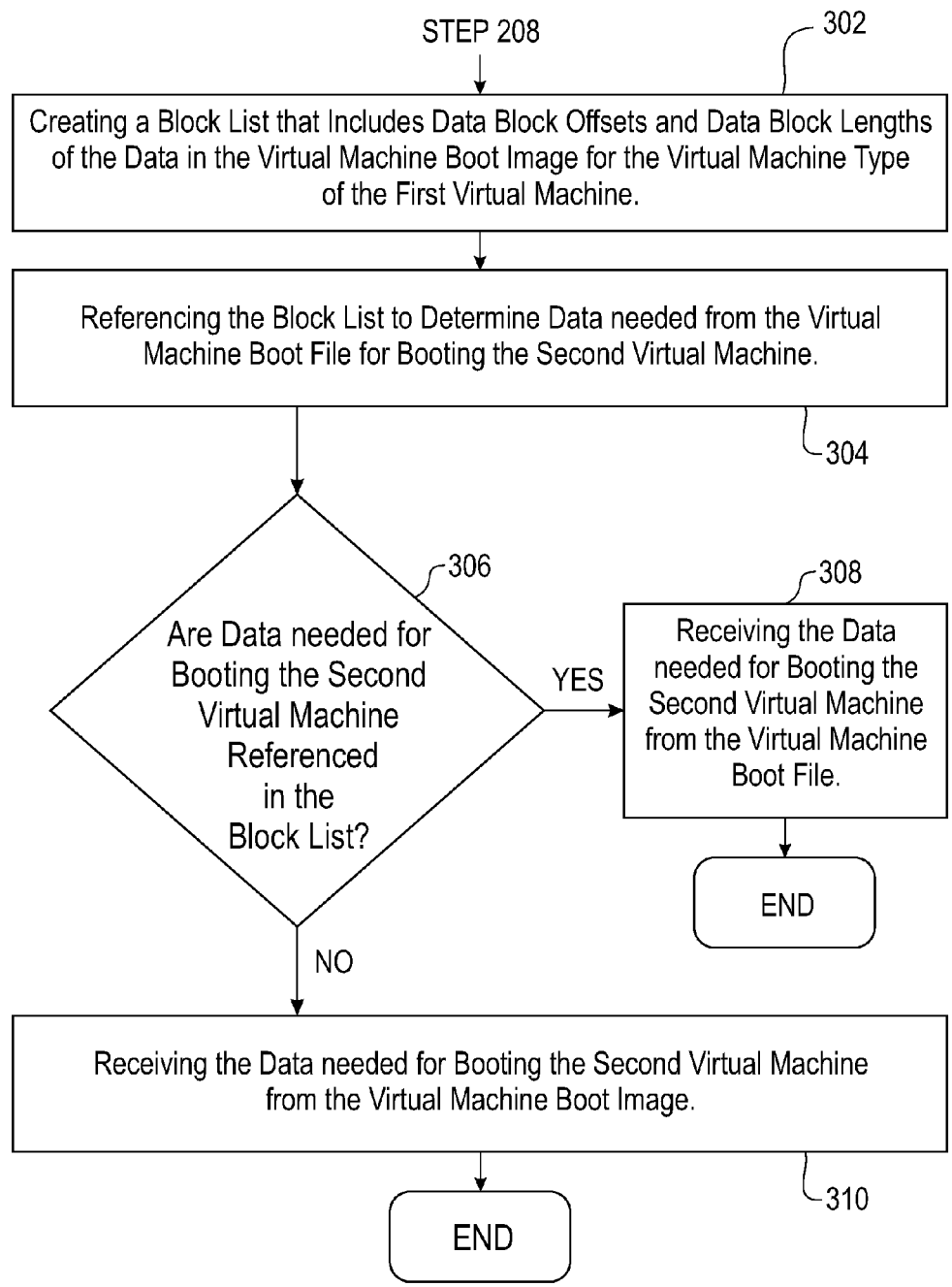
FIG. 3 is a another flow chart of the first method for streaming virtual machine boot services over a network, according to one embodiment.

FIG. 3 is another flow chart of the first method 300 for streaming virtual machine boot services over a network, according to one embodiment. In step 302, the virtual machine monitor $VMM_1$ 110a . . . $VMM_n$ 110n of the first virtual machine $VM_1$ 114a, $VM_2$ 114b . . . $VM_n$ 114n being booted creates a block list. In one embodiment, the block list is an ordered list that includes data block offsets and data block lengths of the data in the virtual machine boot image that are streamed to a virtual machine monitor $VMM_1$ 110a . . . $VMM_n$ 110n for a virtual machine type of the first virtual machine $VM_1$ 114a, $VM_2$ 114b . . . $VM_n$ 114n. For example, the data block offsets and the data block lengths are located in the metadata of the virtual machine boot image. The order of the block list corresponds to the order in the virtual machine boot file.

In one embodiment, the block list is stored in the virtual machine image repository 106. The blocks of the virtual machine boot file are kept in memory of the virtual machine monitor $VMM_1$ 110a . . . $VMM_n$ 110n of the virtual machine $VM_1$ 114a, $VM_2$ 114b . . . $VM_n$ 114n being booted because only a few blocks are required at any given point due to streaming. Accordingly, no disk storage is required for the streamed virtual machine boot file.

In step 306, the virtual machine monitor $VMM_1$ 110a . . . $VMM_n$ 110n of the second virtual machine being booted $VM_1$ 116a, $VM_2$ 116b . . . $VM_n$ 116n determines whether data needed from the virtual machine boot file for subsequently booting the second virtual machine are referenced in the block list. The virtual machine monitor $VMM_1$ 110a . . . $VMM_n$ 110n of the second virtual machine being booted $VM_1$ 114a, $VM_2$ 114b . . . $VM_n$ 114n references the block list to determine whether the data blocks needed to boot the second virtual machine $VM_1$ 114a, $VM_2$ 114b . . . $VM_n$ 114n are in its memory (e.g., cache).

The method proceeds to step 308 if data needed for booting the second virtual machine $VM_1$ $VM_1$ 114a, $VM_2$ 114b . . . $VM_n$ 114n are referenced in the block list. The method proceeds to step 310 if data needed for booting the second virtual machine $VM_1$ 114a, $VM_2$ 114b . . . $VM_n$ 114n are not referenced in the block list.

In step 308, the virtual machine monitor $VMM_1$ 110a . . . $VMM_n$ 110n of the second virtual machine $VM_1$ 116a, $VM_2$ 116b . . . $VM_n$ 116n receives the data needed to boot the second virtual machine $VM_1$ 116a, $VM_2$ 116b . . . $VM_n$ 116n from the virtual machine boot file. For example, the data needed for booting the second virtual machine $VM_1$ $VM_1$ 114a, $VM_2$ 114b . . . $VM_n$ 114n is consumed from the memory of the of the virtual machine monitor $VMM_1$ 110a . . . $VMM_n$ 110n by accessing the virtual machine boot file from memory. In one embodiment, the virtual machine monitor $VMM_1$ 110a . . . $VMM_n$ removes the data blocks from memory after the second virtual machine $VM_1$ $VM_1$ 114a, $VM_2$ 114b . . . $VM_n$ 114n is booted to free memory space.

In step 310, the virtual machine monitor $VMM_1$ 110a . . . $VMM_n$ 110n of the second virtual machine $VM_1$ 114a, $VM_2$ 114b . . . $VM_n$ 114n receives the data needed to boot the second virtual machine $VM_1$ 114a, $VM_2$ 114b . . . $VM_n$ 114n directly from the virtual machine boot image.

There may be deviations from the order of data accesses in the virtual machine boot file for different virtual machine types. In one embodiment, the virtual machine monitor $VMM_1$ 110a . . . $VMM_n$ 110n of a virtual machine being booted $VM_1$ 114a, $VM_2$ 114b . . . $VM_n$ 114n receives the data needed to boot the virtual machine $VM_1$ 114a, $VM_2$ 114b . . . $VM_n$ 114n from the virtual machine boot image, if the number of potential deviations from the order of data accesses are small.

In another embodiment, the most common deviations from the order of data accesses in the virtual machine boot file are recorded over time from the virtual machine boot image when first booting specific virtual machine types, if the numbers of potential deviations are large. The order of data access deviations for the newly encountered virtual machine types are then incorporated from the virtual machine boot image into the virtual machine boot file. The most common deviations from order of data accesses are recorded over time into the virtual machine boot file by introducing a directory structure of the linear blocks.

Figure 4:
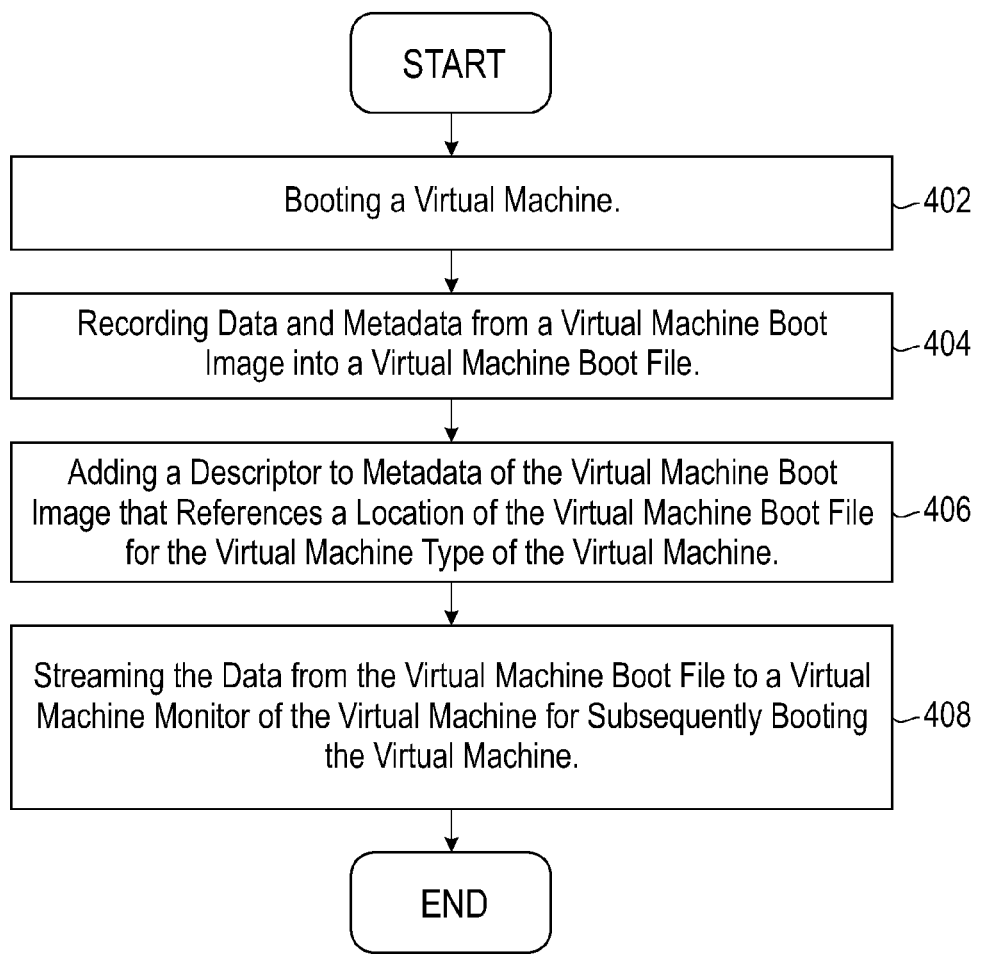
FIG. 4 is a flow chart of a second method for streaming virtual machine boot services over a network, according to one embodiment.

FIG. 4 is a flow chart of a second method 400 for streaming virtual machine boot services over a network, according to one embodiment. The second method is directed to booting a single virtual machine $VM_1$ 114a, $VM_2$ 114b ... $VM_n$ 114n, whereas the first method is directed to booting different virtual machines $VM_1$ 114a, $VM_2$ 114b ... $VM_n$ 114n based on their virtual machine type. In step 402, virtual machine monitor 112a ... 112n boots a virtual machine $VM_1$ 114a, $VM_2$ 114b ... $VM_n$ 114n in response to a request from virtual machine monitor $VMM_1$ 110a ... $VMM_n$ 110n. In step 404, virtual machine monitor $VMM_1$ 110a ... $VMM_n$ 110n of the virtual machine $VM_1$ 114, $VM_2$ 114b ... $VM_n$ 114n being booted records data and metadata from the virtual machine boot image into the virtual machine boot file.

In step 406, virtual machine monitor $VMM_1$ 110a ... $VMM_n$ 110n of the virtual machine being booted $VM_1$ 114a, $VM_2$ 114b ... $VM_n$ 114n adds a descriptor to metadata of the virtual machine boot image. In one embodiment, the descriptor references a location of the virtual machine boot file for the virtual machine type of the virtual machine $VM_1$ 114a, $VM_2$ 114b ... $VM_n$ 114n. In step 408, in order to subsequently boot the same virtual machine $VM_1$ 114a, $VM_2$ 114b ... $VM_n$ 114n the virtual machine monitor $VMM_1$ 110a ... $VMM_n$ 110n streams the data from the virtual machine boot file located in memory.

Figure 5:
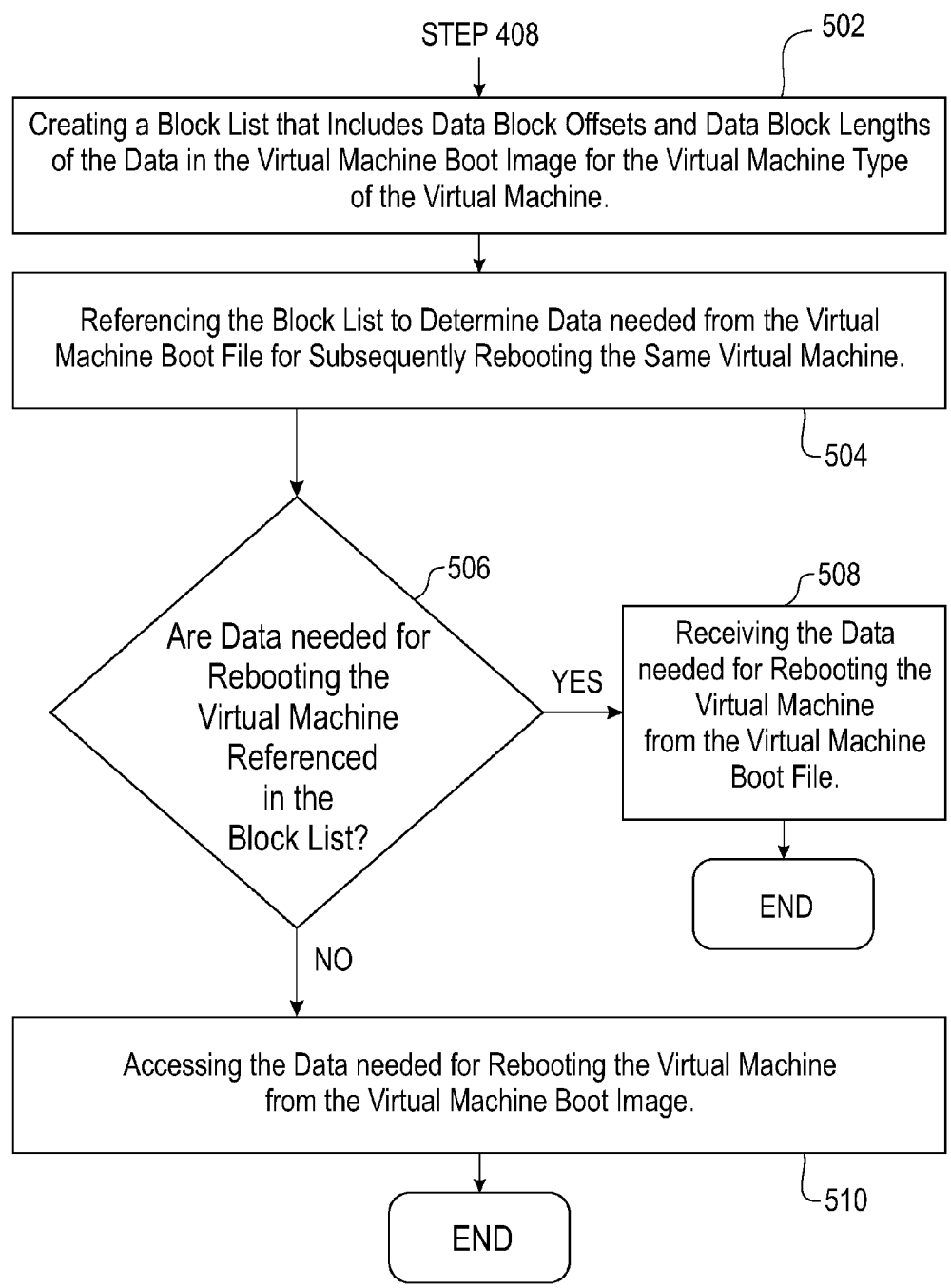
FIG. 5 is a another flow chart of the second method for streaming virtual machine boot services over a network, according to one embodiment.

FIG. 5 is another flow chart of the second method 500 for streaming virtual machine boot services over a network, according to one embodiment. In step 502, the virtual machine monitor $VMM_1$ 110a ... $VMM_n$ 110n of the virtual machine $VM_1$ 114a, $VM_2$ 114b ... $VM_n$ 114n being booted creates a block list that includes data block offsets and data block lengths of the data in the virtual machine boot image for the virtual machine that was booted. In step 504, when subsequently rebooting the same virtual machine $VM_1$ 114a, $VM_2$ 114b ... $VM_n$ 114n the virtual machine monitor $VMM_1$ 110a ... $VMM_n$ 110n references the block list to determine data needed for subsequently booting the same virtual machine $VM_1$ 114a, $VM_2$ 114b ... $VM_n$ 114n from the virtual machine boot file.

In step 506, the virtual machine monitor $VMM_1$ 110a ... $VMM_n$ 110n of the virtual machine $VM_1$ 114a, $VM_2$ 114b ... $VM_n$ 114n being booted determines whether data needed for booting the virtual machine $VM_1$ 114a, $VM_2$ 114b ... $VM_n$ 114n is referenced in the block list. The method proceeds to step 508 if data needed for rebooting the virtual machine $VM_1$ 114a, $VM_2$ 114b ... $VM_n$ 114n are referenced in the block list. The method proceeds to step 510 if data needed for rebooting the same virtual machine $VM_1$ 114a, $VM_2$ 114b ... $VM_n$ 114n are not referenced in the block list.

In step 508, the virtual machine monitor $VMM_1$ 110a ... $VMM_n$ 110n of the virtual machine $VM_1$ 114a, $VM_2$ 114b ... $VM_n$ 114n booting receives the data needed to reboot the virtual machine $VM_1$ 114a, $VM_2$ 114b ... $VM_n$ 114n from the virtual machine boot file. In step 510, the virtual machine monitor $VMM_1$ 110a ... $VMM_n$ 110n of the virtual machine booting $VM_1$ 114a, $VM_2$ 114b ... $VM_n$ 114n receives the data needed to reboot the virtual machine $VM_1$ 114a, $VM_2$ 114b ... $VM_n$ 114n directly from the virtual machine boot image.

Table 1 illustrates experimental results of booting a guest virtual machine $VM_1$ 114a, $VM_2$ 114b ... $VM_n$ 114n over a network using the embodiments of the invention.

TABLE 1

| | Experimental Results | |
|---|---|---|
| Boot | # Data Reads (Offset, Length) | Size (MB) |
| 1 | 54, 735 | 332 |
| 2 | 53, 301 | 321 |
| 3 | 54, 832 | 332 |
| 4 | 55, 060 | 332 |

In an experiment, four virtual machines $VM_1$ 114a, $VM_2$ 114b ... $VM_n$ 114n were booted using the embodiments of the invention. The experiment was conducted by tracing reads from a virtual machine boot image used to boot the virtual machines $VM_1$ 114a, $VM_2$ 114b ... $VM_n$ 114n.

For example, the virtual machine boot image is a linear file. The data offset represents a pointer to the location of the data needed for booting a specific virtual machine type in the virtual machine boot image. The length represents the amount of data that comprises the data needed to boot the virtual machine in the virtual machine boot image. The size represents the amount of data needed from the virtual machine boot image to boot the virtual machine $VM_1$ 114a, $VM_2$ 114b ... $VM_n$ 114n. The disk sector size was 512 bytes, with most reads being in 4 KB, 8 KB, or 512 byte segments.

The virtual machine boot image used in the experiment was 10 GB. A first virtual machine $VM_1$ 114a, $VM_2$ 114b ... $VM_n$ 114n being of a specific virtual machine type was booted by reading 332 MB from the virtual machine boot image. A second virtual machine $VM_1$ 114a, $VM_2$ 114b ... $VM_n$ 114n was booted by reading 321 MB from the virtual machine boot image. A third virtual machine $VM_1$ 114a, $VM_2$ 114b ... $VM_n$ 114n was booted by reading 332 MB from the virtual machine boot image. A fourth virtual machine $VM_1$ 114a, $VM_2$ 114b ... $VM_n$ 114n was booted by reading 332 MB from the virtual machine boot image. The content of the boots are for the different virtual machines $VM_1$ 114a, $VM_2$ 114b ... $VM_n$ 114n being of same virtual machine type on different servers 110a ... 110n, using the same virtual machine boot image, deviated by less than six percent (6%).

The third virtual machine was built on a server 110a ... 110n in a computing cloud, and the virtual machine boot image (10 GB) resided on a local server Network File System (NFS) mounted on the cloud computing server. The boot took approximately 12 minutes, without streaming data from a virtual machine boot image, whereas performing the 54,832 reads for booting and streaming the 332 MB virtual machine boot file took just about 1 minute.

In another experiment the 332 MB boot image file for the virtual machine $VM_1$ 114a, $VM_2$ 114b ... $VM_n$ 114n was compressed to 86 MB and reduced the streaming from the virtual machine boot file to less than 1 minute.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
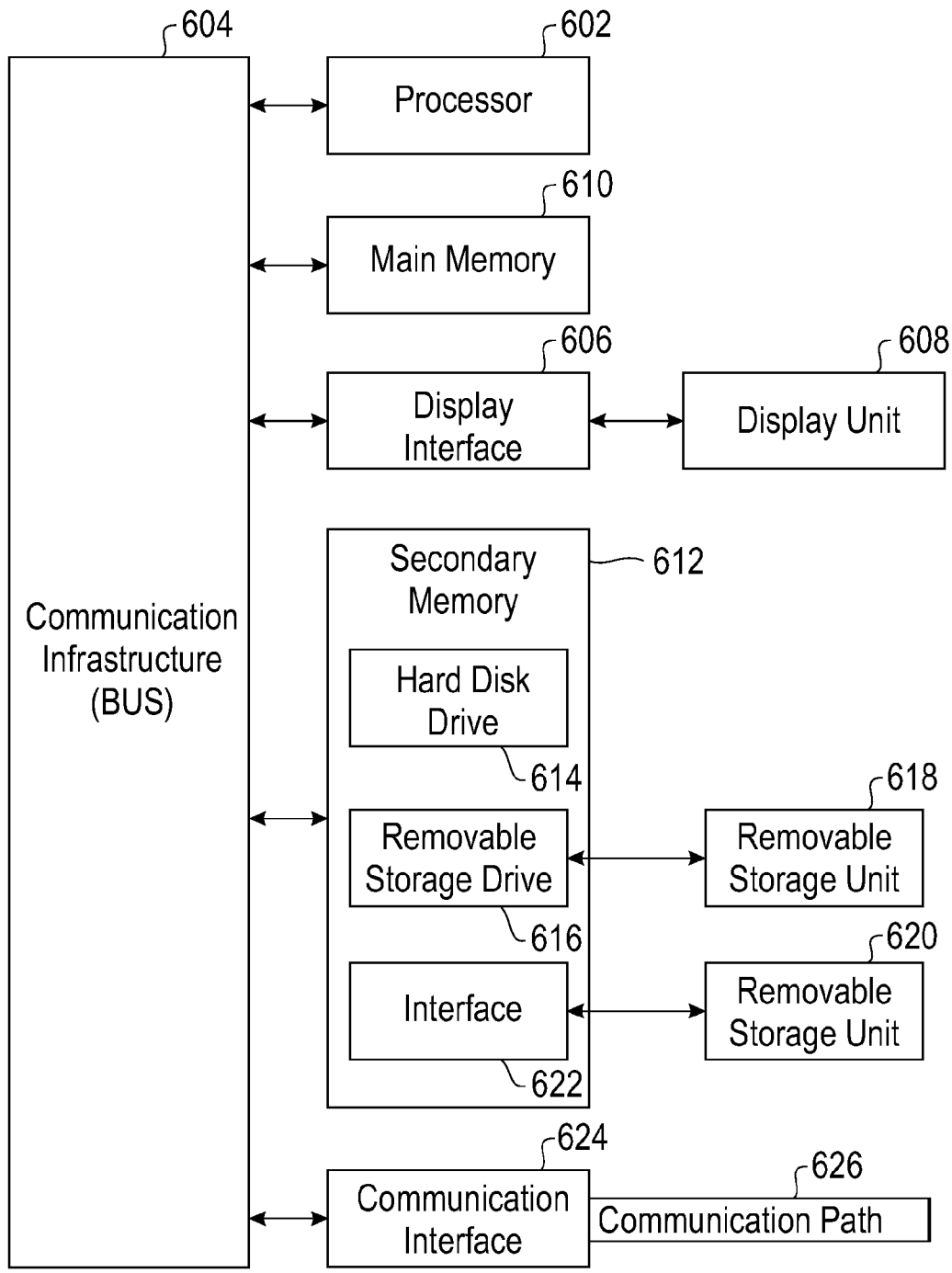
FIG. 6 is a diagram of a system for implementing an embodiment of the invention.

FIG. 6 is a diagram of a system for implementing an embodiment of the invention. The computer system includes one or more processors, such as a processor 602. The processor 602 is connected to a communication infrastructure 606 (e.g., a communications bus, cross-over bar, or network).

The computer system can include a display interface 606 that forwards graphics, text, and other data from the communication infrastructure 606 (or from a frame buffer not shown) for display on a display unit 608. The computer system also includes a main memory 610, preferably random access memory (RAM), and may also include a secondary memory 612. The secondary memory 612 may include, for example, a hard disk drive 616 and/or a removable storage drive 616, representing, for example, a floppy disk drive, a magnetic tape drive, or an optical disk drive. The removable storage drive 616 reads from and/or writes to a removable storage unit 618 in a manner well known to those having ordinary skill in the art. Removable storage unit 618 represents, for example, a floppy disk, a compact disc, a magnetic tape, or an optical disk, etc., which is read by and written to by removable storage drive 616. As will be appreciated, the removable storage unit 618 includes a computer readable medium having stored therein computer software and/or data.

In alternative embodiments, the secondary memory 612 may include other similar means for allowing computer programs or other instructions to be loaded into the computer system. Such means may include, for example, a removable storage unit 620 and an interface 622. Examples of such means may include a program package and package interface (such as that found in video game devices), a removable memory chip (such as an EPROM, or PROM) and associated socket, and other removable storage units 620 and interfaces 622 which allow software and data to be transferred from the removable storage unit 620 to the computer system.

The computer system may also include a communications interface 626. Communications interface 626 allows software and data to be transferred between the computer system and external devices. Examples of communications interface 626 may include a modem, a network interface (such as an Ethernet card), a communications port, or a PCMCIA slot and card, etc. Software and data transferred via communications interface 626 are in the form of signals which may be, for example, electronic, electromagnetic, optical, or other signals capable of being received by communications interface 626. These signals are provided to communications interface 626 via a communications path (i.e., channel) 626. This communications path 626 carries signals and may be implemented using wire or cable, fiber optics, a phone line, a cellular phone link, an radio frequency (RF) link, and/or other communication channels.

In this document, the terms "computer program medium," "computer usable medium," and "computer readable medium" are used to generally refer to media such as main memory 610 and secondary memory 612, removable storage drive 616, and a hard disk installed in hard disk drive 616.

Computer programs (also called computer control logic) are stored in main memory 610 and/or secondary memory 612. Computer programs may also be received via a communication interface 626. Such computer programs, when run, enable the computer system to perform the features of the present invention as discussed herein. In particular, the computer programs, when run, enable the processor 602 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What we claim is:

1. A method of streaming virtual machine boot services over a network, comprising:
    booting a first virtual machine;
    recording data and metadata from a virtual machine boot image into a virtual machine boot file, wherein: the data and metadata are accessed in the process of booting the first virtual machine, said image has setup information of a virtual machine type of the first virtual machine, and said boot file is configured for the virtual machine type of the first virtual machine;
    adding a descriptor to metadata of said image, the descriptor referencing a location of said boot file for the virtual machine type of the first virtual machine;
    booting a second virtual machine of the same type as the first virtual machine by streaming the data from said boot file to a virtual machine monitor of the second virtual machine;
    creating a block list that includes data block offsets and data block lengths of the data in said image for the virtual machine type of the first virtual machine;
    referencing the block list to determine data needed from said boot file for booting the second virtual machine; and
    wherein said data for booting the second virtual machine are receiving from said boot file if said data for booting the second virtual machine are referenced in the block list or from said image if said data for booting the second virtual machine are not referenced in the block list.

2. The method of claim 1, wherein the data block offsets and the data block lengths are located in the metadata of said boot image.

3. The method of claim 1, wherein the block list is stored in a virtual machine image repository.

4. The method of claim 1, wherein the data and the metadata from said boot image are recorded if the data and the metadata are traversed from a virtual machine image repository to a virtual machine monitor of the first virtual machine.

5. The method of claim 1, wherein the data and the metadata from said boot image are recorded if the data and the metadata are traversed from a virtual machine monitor of the first virtual machine to the first virtual machine.

6. The method of claim 1, wherein the data are accessed from said boot image by reading a data block offset and a data block length in the metadata defining a location of the data in said boot image.

7. The method of claim 1, wherein the data are recorded in said boot file in the same order the data were accessed from said boot image.

8. A method of streaming virtual machine boot services over a network, comprising:
    booting a first virtual machine;
    recording data and metadata from a virtual machine boot image into a virtual machine boot file, wherein: the data and metadata are accessed in the process of booting the first virtual machine, said image has setup information of a virtual machine type of the first virtual machine, and said boot file is configured for the virtual machine type of the first virtual machine;
    adding a descriptor to metadata of the said image, the descriptor referencing a location of said boot file for the virtual machine type of the first virtual machine;
    subsequently booting the virtual machine by streaming the data from said boot file to a virtual machine monitor of the virtual machine;
    creating a block list that includes data block offsets and data block lengths of the data in said boot image for the virtual machine type of the virtual machine;

referencing the block list to determine data needed from said boot file for booting the virtual machine; and wherein said data for booting the virtual machine are receiving from said boot file if said data for booting the virtual machine are referenced in the block list or from said image if said data for booting the second virtual machine are not referenced in the block list.

9. The method of claim 8, wherein the data block offsets and the data block lengths are located in the metadata of said boot image.

10. The method of claim 8, wherein the data and the metadata from said boot image are recorded if the data and the metadata are traversed from a virtual machine image repository to a virtual machine monitor of the virtual machine.

11. A system of streaming virtual machine boot services over a network, comprising:

a virtual machine image repository that stores a virtual machine boot image and a virtual machine boot file, wherein said boot image and said boot file are used to boot a virtual machine; and a virtual machine monitor that:

boots a virtual machine of the virtual machine monitor, records data and metadata from said boot image into said boot file, the data and metadata are accessed in the process of booting the virtual machine, said boot image has setup information of a virtual machine type of the virtual machine, and said boot file is configured for the virtual machine type of the virtual machine, adds a descriptor to metadata of said boot image, the descriptor referencing a location of said boot file for the virtual machine type of a virtual machine that is booted, subsequently boots a virtual machine of the same type of a virtual machine previously booted by streaming the data from said boot file, and creates a block list that includes data block offsets and data block lengths of the data in the virtual machine boot image for a type of the virtual machine previously booted, references the block list to determine data needed from the virtual machine boot file for subsequently booting the virtual machine being of the same type of the virtual machine previously booted, and receives data needed for booting the virtual machine from said boot file if said data for booting are referenced in the block list or from said boot image if said data for booting the virtual machine are not referenced in the block list.

12. The system of claim 11, wherein the data block offsets and the data block lengths are located in the metadata of said boot image.

13. The method of claim 11, wherein the data and the metadata from said boot image are recorded if the data and the metadata are traversed from a virtual machine image repository to a virtual machine monitor of the virtual machine.

14. A computer program product of streaming virtual machine boot services over a network, said program product comprising a non-transitory computer readable storage medium having computer readable program code embodied therewith, said program code being executable by a computer to:

boot a first virtual machine;

record data and metadata being accessed for booting the first virtual machine from a virtual machine boot image into a virtual machine boot file, wherein: the data and metadata are accessed in the process of booting the first virtual machine, said boot image has setup information of a virtual machine type of the first virtual machine, and said boot file is configured for the virtual machine type of the first virtual machine;

add a descriptor to the metadata of said boot image, the descriptor referencing a location of said boot file for the virtual machine type of the first virtual machine; and boot a second virtual machine being of the same type of the first virtual machine by streaming the data from said boot file to a virtual machine monitor of the second virtual machine create a block list that includes data block offsets and data block lengths of the data in the virtual machine boot image for a type of the virtual machine previously booted, reference the block list to determine data needed from the virtual machine boot file for subsequently booting the virtual machine being of the same type of the virtual machine previously booted, and receive data needed for booting the virtual machine from said boot file if said data for booting are referenced in the block list or from said boot image if said data for booting the virtual machine are not referenced in the block list.

15. The computer program product of claim 14, wherein the data block offsets and the data block lengths are located in the metadata of the virtual machine boot image.

16. The computer program product of claim 14, wherein the data and the metadata from said boot image are recorded if the data and the metadata are traversed from a virtual machine image repository to a virtual machine monitor of the first virtual machine.

17. The system of claim 11, wherein the data are accessed from said boot image by reading a data block offset and a data block length in the metadata defining a location of the data in said boot image.

18. The computer program product of claim 14, wherein the data are accessed from said boot image by reading a data block offset and a data block length in the metadata defining a location of the data in said boot image.

19. The computer program product of claim 14, wherein the data are recorded in said boot file in the same order the data were accessed from said boot image.

* * * * *